United States Patent
Decker

(10) Patent No.: US 6,173,624 B1
(45) Date of Patent: Jan. 16, 2001

(54) INTEGRATED CAM AND SHIFT FORK ASSEMBLY

(75) Inventor: Christopher J. Decker, Baldwinsville, NY (US)

(73) Assignee: BorgWarner Inc., Troy, MI (US)

(*) Notice: Under 35 U.S.C. 154(b), the term of this patent shall be extended for 0 days.

(21) Appl. No.: 09/178,125

(22) Filed: Oct. 23, 1998

(51) Int. Cl.$^7$ .......................... B60K 17/34; B60K 20/00; F16H 59/00

(52) U.S. Cl. .................. 74/473.37; 74/337.5; 475/269

(58) Field of Search ........................ 74/473.11, 473.12, 74/473.37, FOR 100, 335, 337.5; 475/269

(56) References Cited

U.S. PATENT DOCUMENTS

| | | |
|---|---|---|
| 2,446,393 | 8/1948 | Russell . |
| 2,649,813 | 8/1953 | Barth et al. . |
| 3,370,477 * | 2/1968 | Lewis .................................. 74/337.5 |
| 4,344,335 | 8/1982 | Kawai . |
| 4,449,416 | 5/1984 | Huitema . |
| 4,567,969 | 2/1986 | Makita . |
| 4,790,204 | 12/1988 | Tury et al. . |
| 4,805,472 | 2/1989 | Aoki et al. . |
| 5,159,847 | 11/1992 | Williams et al. . |
| 5,205,179 | 4/1993 | Schneider . |
| 5,363,938 | 11/1994 | Wilson et al. . |
| 5,409,429 * | 4/1995 | Showalter et al. ................ 475/295 |
| 5,456,643 * | 10/1995 | Yamamoto et al. ................ 477/110 |
| 5,460,060 | 10/1995 | Nellums . |
| 5,499,951 | 3/1996 | Showalter . |
| 5,605,201 | 2/1997 | McGinn et al. . |
| 5,735,176 * | 4/1998 | Winkam et al. ................... 74/337.5 |
| 5,740,695 * | 4/1998 | Janson ................................ 74/337.5 |

FOREIGN PATENT DOCUMENTS 0 577 256 A1   1/1994   (EP) .

* cited by examiner

Primary Examiner—David Fenstermacher
Assistant Examiner—William C Joyce
(74) Attorney, Agent, or Firm—Brinks Hofer Gilson & Lione; Greg Dziegielewski

(57) ABSTRACT

An integrated cam and shift fork assembly is disposed on a rotating shift rail. The shift fork assembly includes a cylindrical body having a helical cam at one end. Adjacent the cam end of the body is a cam follower secured to the rotating shift rail. The opposite end of the body either includes a second cam and suitably disposed cam follower or a flat surface engaged by a return spring. The rotating shift rail is driven by an electric motor through a suitable speed reducing and torque increasing drive such as a worm gear set. One or both of the aforementioned cam configurations may be utilized in a transfer case on a single shift rail to, for example, select a high or low speed range, couple the primary and secondary drive lines together or both.

18 Claims, 2 Drawing Sheets

INTEGRATED CAM AND SHIFT FORK ASSEMBLY

BACKGROUND OF THE INVENTION

The invention relates generally to mechanisms for controlling shifts in transfer cases and the like and more specifically to an integrated cam and fork assembly disposed upon a rotatable shift rail.

In both early and many modern transmissions and transfer cases, shifts between various speed ranges and operating conditions are often achieved by a manual linkage controlled by the vehicle operator. Frequently, such linkages include one or a plurality of parallel shift rails which may be translated out of a center, neutral position to a forward or rearward position to select a given gear or operating mode.

In contemporary consumer products such as sport utility vehicles and light and medium duty trucks, gear range and operating modes in transfer cases are now more commonly selected through the agency of an electromechanical, pneumatic or hydraulic operator. A variety of drive assemblies and intermediate linkages have been developed to achieve range selection and transfer case operating mode, e.g., lockup of a viscous clutch, a differential or modulating clutch to directly couple the primary and secondary drive lines.

These devices represent equally varying levels of complexity, sophistication, reliability and cost. Oftentimes, a sophisticated system which provides rapid and precise selection of gears or operating modes falls short from a reliability standpoint. Contrariwise, simple systems often do not provide positive, accurate or repeatable shifts although they are reliable.

The present invention is directed to a shift assembly which achieves both highly accurate positioning of a shift fork with a minimum of components and is thus highly reliable.

SUMMARY OF THE INVENTION

An integrated cam and shift fork assembly is disposed on a rotating shift rail. The shift fork assembly includes a cylindrical body having a helical cam at one end. Adjacent the cam end of the body is a cam follower secured to the rotating shift rail. The opposite end of the body either includes a second cam and suitably disposed cam follower or a flat surface engaged by a return spring. The rotating shift rail is driven by an electric motor through a suitable speed reducing and torque increasing drive such as a worm gear set. One or both of the aforementioned cam configurations may be utilized in a transfer case on a single shift rail to provide single or multiple functions, for example, select a high or low speed range, couple the primary and secondary drive lines together or both.

Thus, it is an object of the present invention to provide an integrated cam and shift fork assembly for use in transfer cases and the like.

It is a further object of the present invention to provide an integrated cam and shift fork assembly which is both straightforward and highly reliable.

It is a still further object of the present invention to provide an integrated cam and shift fork assembly which is positively bi-directionally translated by a pair of helical cams and cooperating cam followers.

It is a still further object of the present invention to provide an integrated cam and shift fork assembly which is positively translated in one direction by a cooperating helical cam and cam follower and in an opposite direction by a return (compression spring).

It is a still further object of the present invention to provide an integrated cam and shift fork assembly which may be utilized singly or multiply on a common rotating shift rail.

Further objects and advantages of the present invention will become apparent by reference to the following description of the preferred embodiment and appended drawings wherein the same reference number refers to the same component, element or feature.

DESCRIPTION OF THE PREFERRED EMBODIMENT

Figure 1:
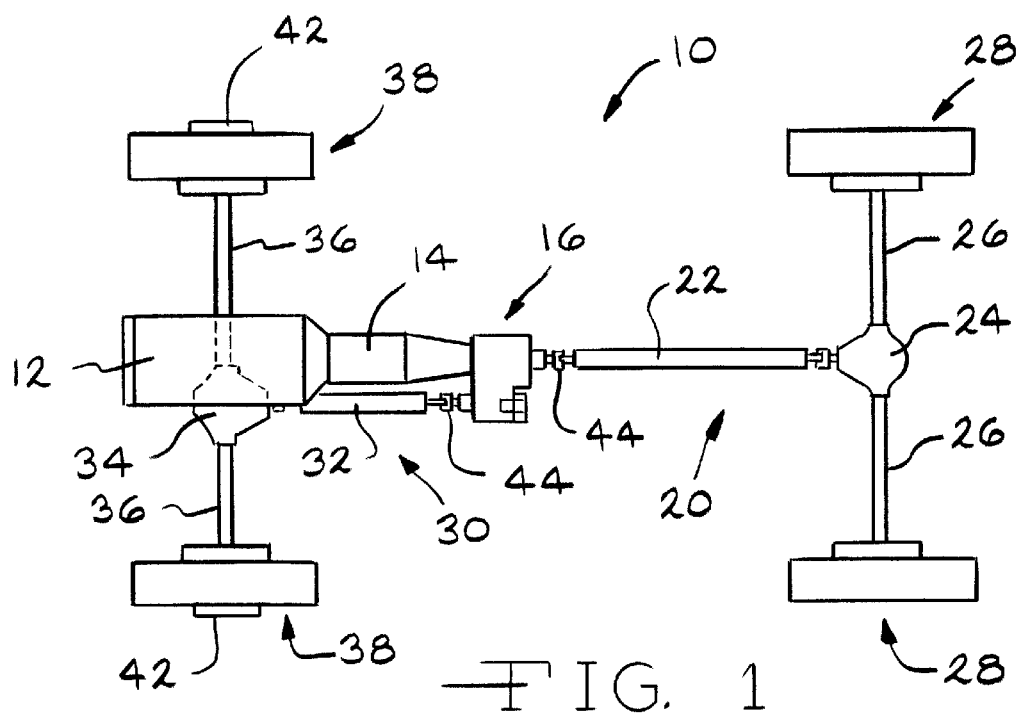
FIG. 1 is a diagrammatic plan view of a four-wheel motor vehicle drive line incorporating the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
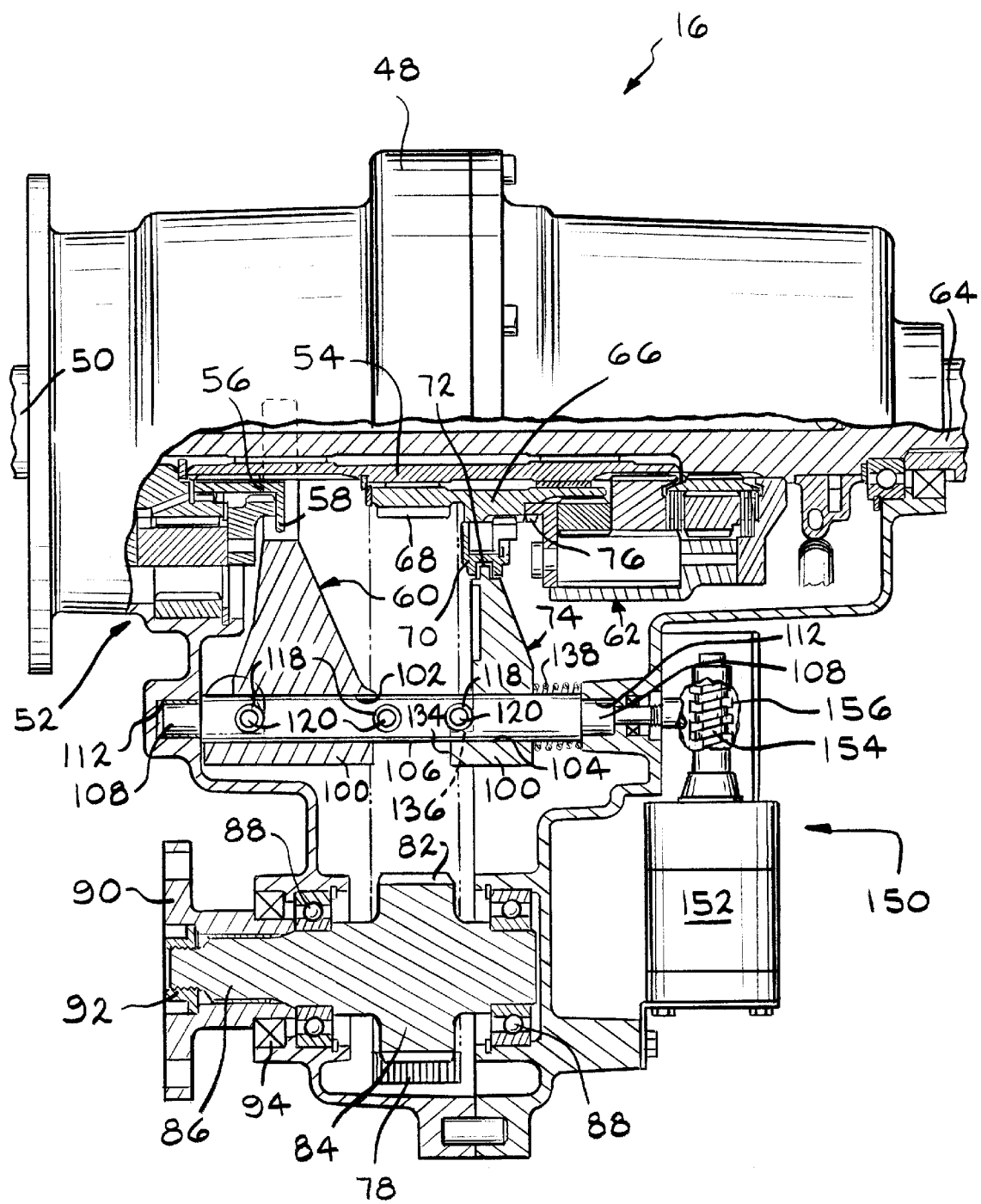
FIG. 2 is a top plan view of a motor vehicle transfer case in partial section incorporating integrated cam and shift fork assemblies according to the present invention.

Turning now to FIG. 2, the transfer case assembly 16 includes a two-part, preferably cast housing 48 having a plurality of openings, ports, shoulders, passageways and the like which receive, locate and support various mechanical components of the transfer case assembly 16. Significant among these components is an input shaft 50 which drives a planetary gear assembly 52. The planetary gear assembly 52 provides a reduced speed, increased torque output which may be selectively provided to an intermediate drive sleeve 54. A first circular dog clutch 56 includes a flange 58 which is engaged by a first shift fork assembly 60. The first dog clutch 56 is splined to and slidably disposed upon the intermediate drive sleeve 54. The dog clutch 56 may be bi-axially translated to engage either direct drive from the input shaft 50 or reduced speed drive from an output member of the planetary gear assembly 52. The intermediate drive sleeve 54 provides such selected high or low speed drive to the input of a torque distribution assembly 62. The torque distribution assembly 62 may comprehend a center differential having a first output driving a primary output shaft 64 and a second output driving a drive tube 66. The torque distribution assembly 62 may also be a viscous type clutch or a hydraulic or electric modulating torque on demand type clutch which provides proportioning control and distribution of torque from the intermediate output sleeve 54 to the primary drive shaft 64 and the drive tube 66.

Concentrically disposed about the intermediate drive sleeve 54 is the drive tube 66 which includes chain drive teeth 68. Splined to and axially slidable along the drive tube 66 is a second circular dog clutch 70 which may be bi-directionally translated by a semi-circular projection 72 extending from a second shift fork assembly 74 which engage a complementarily configured circumferential channel or groove in the second circular dog clutch 70. The second dog clutch 70 may be translated bi-directionally and when moved to the right as illustrated in FIG. 2, engages splines or gear teeth 76 on the torque distribution assembly 62 thereby directly coupling the drive tube 66 to the housing of the torque distribution assembly 62 and effectively ceasing its activity or locking it out. So positioned, the primary output shaft 64 and the drive tube 66 which drives the secondary output of the transfer case assembly 16 are coupled or locked together. When the second dog clutch 70 is in the position illustrated in FIG. 2, the center differential is free to differentiate or the modulating or viscous clutch is free to control as necessary. A chain 78 is received upon the chain drive teeth 68 of the drive tube 66 and, in turn, is received upon teeth 82 of a driven chain sprocket 84. The driven chain sprocket 84 may be integrally formed with a secondary output shaft 86 which is received within and supported upon a plurality of anti-friction bearings such as the ball bearing assemblies 88. The secondary output shaft 86 is preferably terminated by a flange 90 which may form a portion of a universal joint 44 and may be secured to the secondary output shaft 86 by a nut 92 or similar fastener. A suitable oil seal 94 extending about a portion of the flange 90 or the secondary output shaft 86 provide a lubricant tight seal thereabout.

Figure 3:
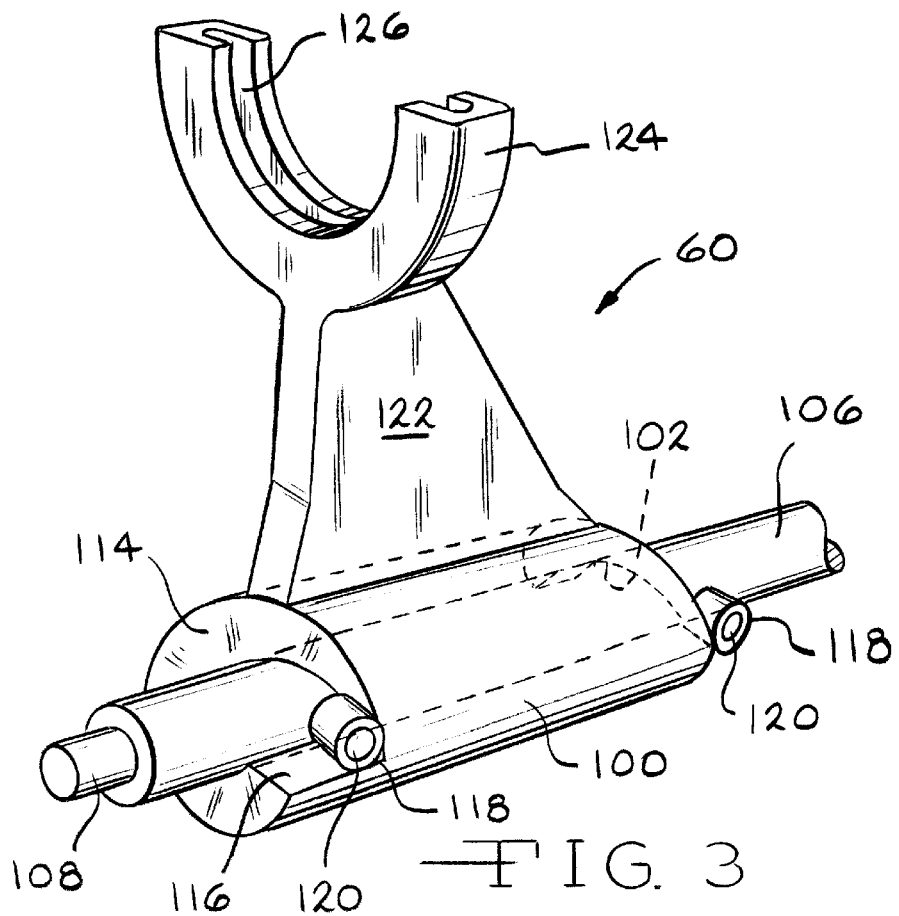
FIG. 3 is an enlarged, perspective view of an integrated cam and shift fork assembly according to the present invention.

Referring now to FIGS. 2 and 3, both the first shift fork assembly 60 and the second shift fork assembly 74 include bodies 100 and 100' which define through, cylindrical internal passageways 102 and 104, respectively, which receive a single shift rail 106. The shift rail 106 includes a reduced diameter portion 108 at each end which is received within suitably sized and aligned bores 112 in the housing 48 of the transfer case assembly 16. Adjacent the through cylindrical passageway 102 and disposed at each end face of the body 100 of the shift fork assembly 60 is a helical cam 114. An axial discontinuity 116 extends between the axially separated ends of helical cams 114 and provides a shoulder or stop. The helical cams 114 are engaged by a complementarily configured and spaced apart pair of cam followers 118. Preferably, in order to reduce operating friction, the cam followers 118 are rollers freely rotatably and axially captively mounted upon a respective pair of mounting pins 120 extending radially from the shift rail 106. Fixed pins (followers) without rollers, may, however, also be utilized. The shift fork assembly 60 also includes a generally radially extending web 122 and a semi-circular fork 124 having a semi-circular channel 126 which engages the circular flange 58 of the first dog clutch 56. It will be appreciated that upon rotation of the shift rail 106, cooperation between the cam followers 116 and the helical cams 114 positively translates the first shift fork assembly 60 axially along the shift rail 106. The axial discontinuities 116 of the cam surfaces 114 also provide a positive stop or rotational travel limit in one direction of rotation of the shift rail 106 and thus axial motion of the first shift fork assembly 60.

The second shift fork assembly 74 is similar to the first shift fork assembly 60, but rather than including two helical cam surfaces 114, its body 100' includes a single helical cam surface 134 and an axial discontinuity 136 which are engaged by a single cam roller or follower 118 rotatably supported upon a mounting pin 120. This configuration provides only uni-directionally driven translation of the second shift fork assembly 74 by the shift rail 106. Axial translation of the shift fork assembly 74 in the opposite direction is provided by a compression spring 138 disposed concentrically about the shift rail 106 between the second shift fork assembly 74 and a portion of the housing 48.

Rotation of the shift rail 106 is achieved by a drive assembly 150 comprising a bi-directional electric motor 152 having a worm gear output 154 which drives a complementarily configured gear 156 which directly drives and bi-directionally rotates the shift rail 106. It will be appreciated that appropriate selection of the location of the cam followers 118 on the shift rail 106, the angle of the helical cams 114 and 134 as well as the incorporation of any regions of dwell in the cams 114 and 134 permit and facilitate achievement of various sequences of operation of the dog clutches 56 and 72 in order to achieve a desired control strategy or operating scheme.

It will therefore be appreciated that an integrated cam and shift fork assembly of either the first configuration described above as the first shift fork assembly 60 having a pair of spaced-apart cam followers 118 cooperating with complementarily spaced-apart helical cams 114 or the second configuration described above as the second shift fork assembly 74 having a single helical cam 134, cam follower 118, and a compression spring 138 disposed adjacent the body 100' of the shift fork assembly 74 are also suited for use in mechanical devices other than transfer cases. Thus, the first shift fork assembly 60 and the second shift fork assembly 74 may be utilized in motor vehicle transmissions and other power distribution devices. Furthermore, the first shift fork assembly 60 and the second shift fork assembly 74 may be utilized with pneumatic or a hydraulic drive systems in addition to the electric motor 152 described above.

The foregoing disclosure is the best mode devised by the inventor for practicing this invention. It is apparent, however, that apparatus incorporating modifications and variations will be obvious to one skilled in the art of shift control mechanisms. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An integrated cam and shift fork assembly in combination with a vehicle transfer case comprising,
    a shift rail supported in the transfer case for rotation about an axis,
    a first cam follower secured directly to and extending from said shift rail,
    a second cam follower secured directly to and extending from said shift rail and spaced from said first cam follower,
    a shift fork rotatably receiving said shift rail and having a feature adapted to engage and bi-directionally translate a clutch component,
    said shift fork having a first cam engaged by said first cam follower and a second cam spaced from said first cam and engaged by said second cam follower,
    a bi-directional motor, and
    a speed reducing mechanism interconnecting said bi-directional motor and said shift rail.

2. An integrated cam and shift fork assembly according to claim 1 wherein two of said shift fork assemblies are disposed upon a single rotating shift rail.

3. An integrated cam and shift fork assembly according to claim 1 wherein said cam includes a shoulder coupling axially displaced portions of said cam.

4. An integrated cam and shift fork assembly according to claim 1 wherein said shift fork feature is a channel.

5. An integrated cam and shift fork assembly according to claim 1 further including a planetary gear drive assembly and a dog clutch configured to select direct drive and reduced speed drive and wherein said shift fork assembly feature engages said dog clutch.

6. An integrated cam and shift fork assembly in combination with a vehicle transfer case comprising,
    a shift rail supported in the transfer case for rotation about an axis,
    first and second spaced-apart cam followers secured to and extending from said shift rail,
    a shift fork assembly rotatably receiving said shift rail and including a body and a shift fork having a feature adapted to engage and bi-directionally translate a clutch, said body having first and second opposed ends defining first and second parallel helical cams, said first cam follower engaging said first helical cam and said second cam follower engaging said second helical cam,
    a bi-directional motor, and
    a speed reducing mechanism interconnecting said motor and said shift rail.

7. An integrated cam and shift fork assembly according to claim 6, wherein two of said shift fork assemblies are disposed upon a single rotating shift rail.

8. An integrated cam and shift fork assembly according to claim 6 wherein said cam includes a surface coupling axially displaced portions of said cam.

9. An integrated cam and shift fork assembly according to claim 6 wherein said shift fork feature is a channel.

10. An integrated cam and shift fork assembly according to claim 6 wherein said shift fork feature is a projection.

11. An integrated cam and shift fork assembly according to claim 6 further including a planetary gear drive assembly and a dog clutch configured to select direct drive and reduced speed drive and wherein said shift fork assembly feature engages said dog clutch.

12. An integrated cam and shift fork assembly according to claim 6 wherein said motor is an electric motor.

13. An integrated cam and fork assembly in combination with a vehicle transfer case comprising,
    a shift rail supported in the transfer case for rotation about an axis,
    a first cam follower secured to and extending from said shift rail,
    a second cam follower spaced from said first cam follower and secured to and extending from said shift rail,
    a shift fork rotatably receiving said shift rail and having a feature adapted to engage and bi-directionally translate a clutch component, said shift fork having a first cam engaged by said first cam follower and a second cam engaged by said second cam follower and parallel and spaced from said first cam,
    a bi-directional motor, and
    a speed reducing mechanism interconnecting said motor and said shift rail.

14. An integrated cam and shift fork assembly according to claim 13 wherein two of said shift fork assemblies are disposed upon a single rotating shift rail.

15. An integrated cam and shift fork assembly according to claim 13 wherein said cam includes a surface coupling axially displaced portions of said cam.

16. An integrated cam and shift fork assembly according to claim 13 wherein said shift fork feature is a channel.

17. An integrated cam and shift fork assembly according to claim 13 wherein said shift fork feature is a projection.

18. An integrated cam and shift fork assembly according to claim 13 further including a planetary gear drive assembly and a dog clutch configured to select direct drive and reduced speed drive and wherein said shift fork assembly feature engages said dog clutch.

* * * * *